United States Patent [19]

Lisec, Jr.

[11] Patent Number: 4,471,895
[45] Date of Patent: Sep. 18, 1984

[54] PROCESS AND APPARATUS FOR CUTTING LAMINATED GLASS

[76] Inventor: Peter Lisec, Jr., Kindergartenstrasse 27, Neufurth, Austria

[21] Appl. No.: 418,263

[22] Filed: Sep. 15, 1982

[30] Foreign Application Priority Data

Apr. 28, 1982 [AT] Austria ................ 1659/82

[51] Int. Cl.³ .................. B26F 3/06; C03B 33/02
[52] U.S. Cl. ...................... 225/2; 225/93.5; 225/96.5
[58] Field of Search ............ 225/2, 93.5, 96.5

[56] References Cited

U.S. PATENT DOCUMENTS

| | | | |
|---|---|---|---|
| 662,924 | 12/1900 | Dugon | 225/96.5 |
| 1,738,229 | 12/1929 | Campbell et al. | 225/2 |
| 1,771,510 | 7/1930 | Penning | 225/93.5 |
| 1,959,545 | 5/1934 | Paxton | 225/2 |
| 1,966,353 | 7/1934 | McConnell, Jr. | 225/2 |
| 1,969,394 | 8/1934 | Chase | 225/93.5 |
| 3,253,756 | 5/1966 | Haley et al. | 225/96.5 X |

Primary Examiner—Frank T. Yost
Attorney, Agent, or Firm—Young & Thompson

[57] ABSTRACT

In a process for cutting laminated glass, the laminated glass is scored on both sides, and bent first to one and then to the other side, the two parts of the laminated glass being pulled apart while performing the second bending step. The thus-tensioned plastic sheeting is melted off simultaneously over the entire length of the parting line by a jet of heated air directed into the gap formed by the bending operation. The apparatus for conducting the process comprises two plate-like supports for the laminated glass to be cut, at least one of these supports being pivotable to and fro about an axis extending in the junction zone between the two supports. The supports (1, 2) are provided at their lower edges with conveying elements (5, 6) for the laminated glass (10) and with clamping devices (13, 14) for fixing the laminated glass (10) in place. Furthermore, a hot-air duct (15) is provided, having a slotted nozzle (30) oriented toward the junction zone (3) between the supports (1, 2).

12 Claims, 4 Drawing Figures

PROCESS AND APPARATUS FOR CUTTING LAMINATED GLASS

The invention relates to a process for cutting laminated glass, especially two-sheet laminated glass, wherein the laminated glass is scored on both sides, the laminated glass is bent first to one side and then to the other side, and finally the plastic sheeting located between the panes of the laminated glass is melted off by the supply of heat.

The procedure when cutting two-sheet laminated glass heretofore has been to score the pane, disposed horizontally on a cutting table, on one side, and then to turn the pane and again score same on the other side. Thereupon the pane was bent, and the synthetic resin film (e.g. a polyvinyl butyral film) arranged between the panes was cut with a blade. But it is difficult in this mode of operation to turn the pane, scored as it is on one side. Moreover, the cutting edge of the blade becomes blunt in a very short period of time.

In order to overcome these problems, it has also been suggested to score horizontally disposed laminated glass panes on both sides, and to melt off the plastic sheeting by heating with infrared radiation after bending the panes. When melting the plastic sheeting by heating with infrared rays, only a gradual heating occurs so that the plastic sheeting melts off irregularly and, moreover, the glass sheets are likewise heated up considerably, often leading to stress cracks.

All of the conventional processes have the disadvantage in common that the glass breaks with a scalloped edge during bending and/or during the return movement, in the zone of the cutting line, so that the cutting edges, rather than being clean, are irregular.

It is an object of the invention to provide a process of the type discussed above, but free from the aforementioned disadvantages.

According to the invention, this object has been attained by pulling the two parts of the laminated glass apart while executing the second bending step, so that the plastic sheeting is tensioned in the separating zone; and by melting off the plastic sheeting by a jet of heated air oriented into the gap formed by the bending step, the plastic sheeting being melted off simultaneously over the entire length of the parting line.

By the feature that the two parts of the laminated glass are pulled apart during the second bending step, the scalloping of the glass edges is prevented. Due to the special mode of operation while melting the synthetic resin film, a clean melting-off line is obtained; an extensive heating up of the glass pane is prevented since heated air is supplied for only a brief period of time, by injecting hot air into the separating gap.

The invention furthermore relates to an apparatus for conducting the process, comprising two plate-shaped supports for the two-sheet laminated glass to be cut, at least one of these supports being pivotable to and fro about an axis extending in the junction zone between the two supports, and movable cutting tools arranged in the junction zone, this apparatus being characterized in that the supports are oriented essentially vertically and have conveying elements for the laminated glass at their lower edges; that clamping devices for retaining the laminated glass thereon are associated with the supports; and that a hot-air duct is provided which comprises a slotted nozzle for the ejection of hot air, oriented toward the junction zone between the supports.

Additional features and advantages of the invention can be seen from the subclaims and from the following description of a preferred embodiment with reference to the drawings wherein:

Figure 1:
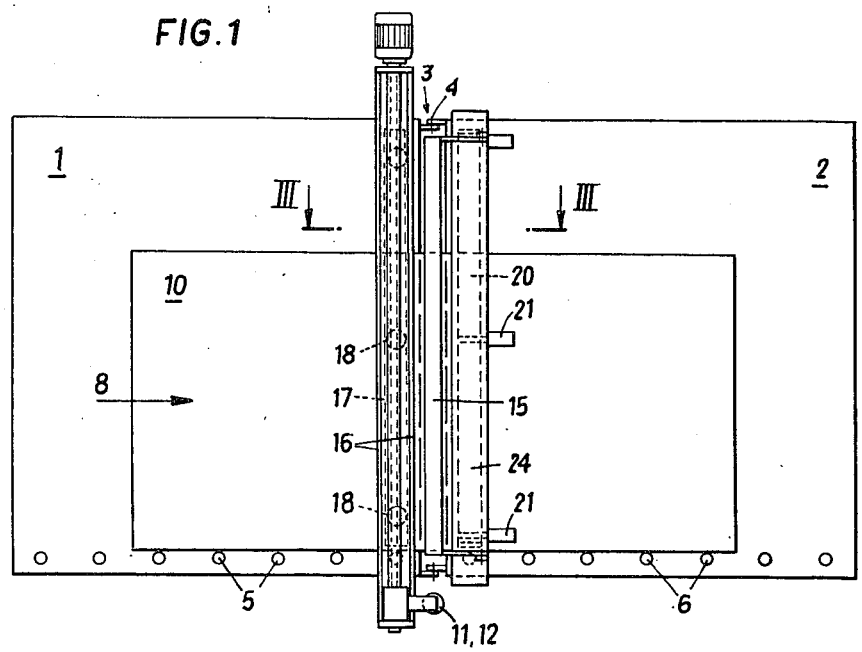
FIG. 1 shows a cutting device in an elevational view.

The apparatus for cutting laminated glass, in particular two-sheet laminated glass, comprises two-plate like supports 1 and 2, pivotable relatively to each other about an essentially vertical axis 4 extending in the junction zone 3 between the supports 1 and 2. In the illustrated embodiment, the plate-like support 1 which is the first in the conveying direction (arrow 8) is fixedly mounted on the frame whereas the second plate-like support 2 is pivotable about the axis 4 in the direction of the double arrow 9 in FIG. 3. The two supports 1 and 2 are substantially upright but are inclined rearwardly by a few degrees and carry, on their lower edges, conveying devices in the form of conveyor rollers 5 and 6, respectively.

Laminated glass 10 to be cut apart is conveyed into the apparatus resting edgewise on the conveyor rollers 5 and in contact with the front side of the plate-like support 1, in the direction of arrow 8.

The correct alignment of the laminated glass with respect to the cutting devices, to be described below, is determined with the aid of adjustable stops or measuring strips or alternatively by position sensors associated with the conveyor rollers 5 and/or 6. In particular, position sensors (e.g. incremental transducers) associated with the conveyor rollers 5 and/or 6 permit extensive automation of the cutting position determination.

The frontal surface of each of the supports 1 and 2 is fashioned as a perforated plate 7; and an air cushion can be produced between each plate 7 and the laminated glass 10. For this purpose, compressed air can be supplied to the openings, not shown, in the plates 7. The air cushion provides practically frictionless movement of the glass in the apparatus of this invention.

Cutting tools 11 and 12, clamping devices 13 and 14, as well as a hot-air duct 15 are arranged in the junction zone 3 between the two supports 1 and 2.

The cutting tools 11 and 12 are guided on rails 16 and movable to and fro in the junction zone 3 for scoring the panes. The cutting tools 11 and 12 are moved by spindle drive mechanisms, as shown in this embodiment, but they can also be movable by means of chain pulleys or the like.

The clamping means 13 associated with the support 1 comprises a clamping bar 17 which can be operated, i.e. pressed against the support 1 or a laminated glass pane 10 disposed thereon, with the aid of pressure medium cylinders 18 attached to or resting on an auxiliary frame 19 rigidly joined to the support 1.

Figure 2:
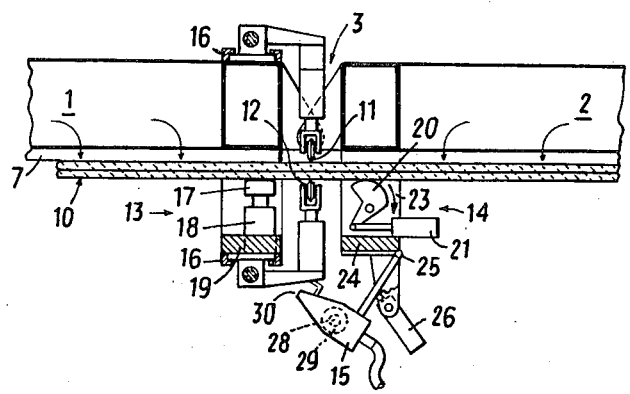
FIG. 2 shows a section along line III—III of FIG. 1 while the scoring work is performed.

The clamping device 14 associated with the support 2 is fashioned as an eccentric 20 pivotable into its operative position by means of pressure medium cylinders 21 about an axle 22 immovable with respect to the support 2 (arrow 23 in FIG. 2). By the special design of the eccentric 20, the portion of the laminated glass 10 in contact with the support 2 is not only secured in place with respect to the support 2, but is additionally stressed in a direction away from the junction zone 3 between the supports 1 and 2.

Figure 3:
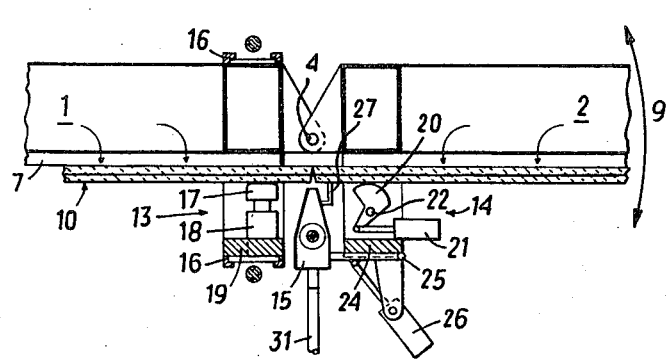
FIG. 3 shows a section along line III—III of FIG. 1 with the hot-air duct swung into place.

The hot-air duct 15, in the illustrated embodiment, is pivotable with the aid of pressure medium cylinders 26 between the final positions shown in FIGS. 2 and 3 about an axle 25 which, just as the axle 22 for the eccentric 20, is mounted on an auxiliary frame 24 rigidly secured to the support 2. The hot-air duct 15 has a stop 27 attached thereto which, as shown in FIG. 3, ensures the exact alignment of the hot-air duct 15 with respect to the laminated glass. A heating rod 28 is located in the hot-air duct 15, this rod carrying fins 29 whereby the air in the hot-air duct can be heated up to temperatures of 200°–300° C. At its front end, the hot-air duct 15 has a slotted nozzle 30 from which heated air can be ejected in bursts into the separating zone to melt off the synthetic resin film connecting the individual sheets of the laminated glass. For this purpose, one or several air conduits 31 are connected to the hot-air duct 15, through which air can be forced into the hot-air duct 15.

In order to increase the pretensioning effected by the eccentric 20, the conveyor rollers 6 of support 2 are operable independently of the conveyor rollers 5 of support 1, so that the pretensioning exerted by the eccentric 20 is enhanced.

To promote the securement of laminated glass 10 on the supports 1 and 2 by the clamping devides 13 and 14, a vacuum can be applied to the openings, not shown, in each of the air-permeable plates 7, so that the laminated glass is sucked against the supports 1 and 2. This ensures that the laminated glass 10 is immovably in contact with the supports 1 and 2.

The apparatus described above operates as follows:

Laminated glass 10 is advanced in the direction of arrow 8 while resting on edge on the conveyor rollers 5 and in contact, via the air cushion, with the support 1, until the desired relative position with respect to the cutting tools 11 and 12 has been reached. In this phase, the support 2 is exactly coplanar with support 1. As soon as the desired final position has been attained, the laminated glass is fixed in position by operating the clamping devices 13 and 14 and by the application of a vacuum to the openings in the plates 7, whereupon the cutting tools 11 and 12 are operated to score the glass panes of the laminated glass 10 on both sides.

Figure 4:
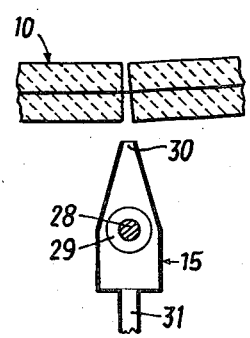
FIG. 4 shows, on an enlarged scale, the parting line after the second bending step.

After the scoring step, bending is first executed toward the front, for which purposes the support 2 is pivoted about the axis 4 forwardly by a few degrees. After this first bending step, the support 2 is moved about the axis 4 toward the rear to execute the second bending step. Due to the fact that the part of the laminated glass 10 resting on the support 2 is stressed toward the eccentric 20 and optionally by the conveyor rollers 6 in a direction of a movement away from the bending zone which is the junction zone 3, a position is reached during the second bending step as shown schematically in FIG. 4, with the plastic sheeting being stretched between the glass panes of the laminated glass 10.

Even before beginning the second bending operation, the hot-air duct 15 has been pivoted into the position shown in FIG. 3, and, after a movement of the support 2 by 1° toward the rear, ejection of hot air from the slotted nozzle 30, having a width of 1 mm, is begun. By means of the air exiting from the slotted nozzle 30, which air has been heated to 200°–300° C., the plastic sheeting is immediately melted so that, after termination of the bending step (that is, after a total pivoting of 4°–5°), the plastic sheeting has already been severed over its entire length. The hot air is applied for only 1–3 seconds, to avoid extensive heating of the glass.

Thereafter the support 2 is returned forwardly to its position wherein it is aligned with the support 1; but on account of the pretensioning described above, the glass edges are no longer in contact with each other in the zone of the thus-produced parting line, so that damaging of the glass edge as by scalloping is avoided. By operating the conveyor rollers 6 after releasing the eccentric 20 and switching over of the air flow through the openings in the plates 7 to compressed air, the cut-off pieces of the laminated glass 10 are discharged from the apparatus.

Since laminted glass is retained with exactness in the apparatus of this invention, it is possible to cut even very narrow strips from laminated glass.

What is claimed is:

1. In a process for cutting laminated glass having plastic sheeting located between two panes of glass, comprising scoring a sheet of laminated glass on both sides, bending the laminated glass first to one side and then to the other side about a bend line, and melting the plastic sheeting located between the panes of the laminated glass; the improvement comprising, during the execution of the second bending step, pulling apart the two parts of the laminated glass that are on opposite sides of said bend line so that the plastic sheeting is stretched between said two parts, and melting the plastic sheeting between said two parts by a jet of heated air directed into the gap between the two parts simultaneously over the entire length of said gap.

2. Process according to claim 1, and injecting air heated to 200°–300° C. for 1–3 seconds into said gap.

3. Process according to claim 1, in which, during the second bending step, the glass is bent by a total of 4°–5°, hot air for melting the plastic sheeting being injected into said gap after bending by 1°.

4. In apparatus for cutting laminated glass, comprising two plate-like supports for the laminated glass to be cut, means mounting at least one of said supports for pivotal movement to and fro relative to the other support, and movable cutting tools for cutting the glass along a straight line in the region between the supports; the improvement in which the supports (1, 2) are substantially upright, conveying elements (5, 6) for the laminated glass (10), said conveying elements being disposed at the lower edges of the supports; clamping devices (13, 14) releasably to retaining the laminated glass (10) on the supports; and a hot-air duct (15) having a slotted nozzle (30) for the ejection of heated air, said nozzle being directed toward the region (3) between the supports (1, 2).

5. Apparatus according to claim 4, in which the said clamping device (13) associated with the support (1) which is the first traversed by the glass in the direction (8) in which the glass is conveyed by said conveying elements (5, 6), is a bar (17) pressing the laminated glass (10) against the support (1).

6. Apparatus according to claim 4, in which the clamping device (14) associated with the second support (2) traversed by the glass is an eccentric (20) pressing the adjacent portion of the laminated glass (10) against the second support (2) and simultaneously urging this portion of the glass in a direction away from the region (3) between the two supports (1, 2).

7. Apparatus according to claim 4, in which the clamping devices (13, 14) are arranged directly on both sides of the region (3) between the supports (1, 2).

8. Apparatus according to claim 4, in which the supports (1, 2) are air-cushion conveyors (7), wherein a vaccum can be applied, during the second bending step, to outlet openings for air constituting the air cushion, in order to enhance the securement of the portions of the laminated glass (10) to the supports (1, 2).

9. Apparatus according to claim 4, and a heating rod (28) in the hot-air duct (15) for heating the air contained in the hot-air duct (15), this rod extending over the entire length of the hot-air duct.

10. Apparatus according to claim 4, in which the slotted nozzle (30) of the hot-air duct (5) has a width of about 1 mm.

11. Apparatus according to claim 4, and means mounting the hot-air duct (15) for swinging movement into and out of its operative position about an axle (25) affixed to a frame which carries said supports and tools and clamping devices.

12. Apparatus according to claim 11, and a stop (27) for the hot-air duct (15), said stop being in contact with the laminated glass (10) when the hot-air duct (15) is in its operative position.

* * * * *